United States Patent [19]

Hahm et al.

[11] 3,964,580
[45] June 22, 1976

[54] BRAKE SHOE FOR SPOT-TYPE DISC BRAKES

[75] Inventors: Heinz Gunter Hahm, Frankfurt am Main; Nedo Igor Pocci, Neuenhain, both of Germany

[73] Assignee: ITT Industries, Inc., New York, N.Y.

[22] Filed: Mar. 6, 1975

[21] Appl. No.: 555,914

Related U.S. Application Data

[63] Continuation of Ser. No. 448,767, March 6, 1974, abandoned.

[30] Foreign Application Priority Data

Mar. 24, 1973  Germany............................ 2314823

[52] U.S. Cl............................. 188/73.1; 188/250 G
[51] Int. Cl.² ....................................... F16D 69/04
[58] Field of Search............ 188/73.1, 250 B, 250 G

[56] References Cited
UNITED STATES PATENTS 2,628,693   2/1953   Rodger ...................... 188/250 G X
3,486,589   12/1969  Hillegoss ..................... 188/250 B X
3,638,764   2/1972   Anders............................... 188/73.1

FOREIGN PATENTS OR APPLICATIONS 2,108,233   4/1972   France............................... 188/73.1
1,136,165   9/1962   Germany ........................... 188/73.1

*Primary Examiner*—George E. A. Halvosa
*Attorney, Agent, or Firm*—John T. O'Halloran; Menotti J. Lombardi, Jr.; Alfred C. Hill

[57] ABSTRACT

There is disclosed a brake shoe including a backing plate having a recess therein to receive the friction pad. Each of the radially inner and outer vertical walls of the recess with respect to the brake disc axis have a different predetermined configuration to retain the friction pad in the recess and to ensure that the entire backing plate receives the braking stresses rather than just a retaining arrangement employed to assist in retaining the friction pad in the recess.

5 Claims, 5 Drawing Figures

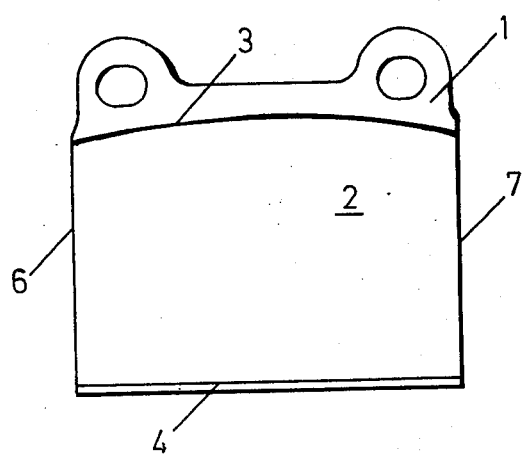
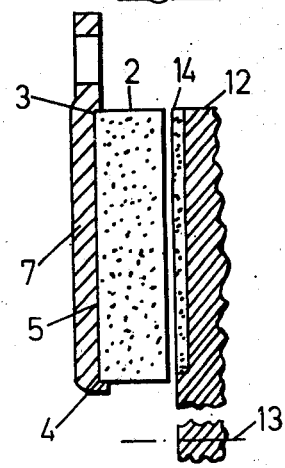
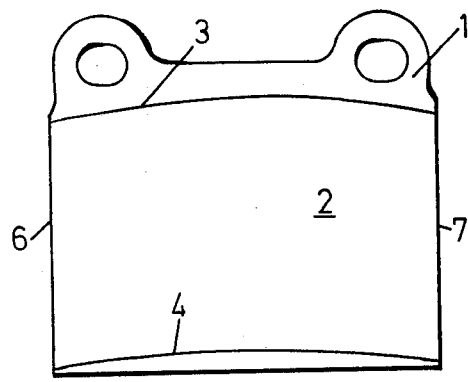
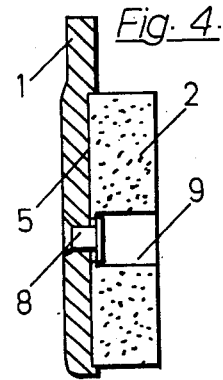
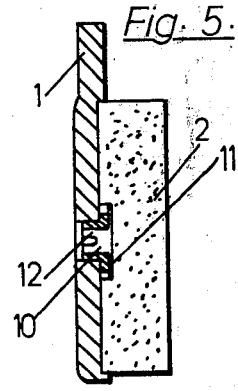

BRAKE SHOE FOR SPOT-TYPE DISC BRAKES

CROSS-REFERENCE TO RELATED APPLICATIONS

This is a continuation of application Ser. No. 448,767, filed Mar. 6, 1974, now abandoned.

BACKGROUND OF THE INVENTION

This invention relates to a brake shoe for spot-type disc brakes of the type having the friction pad fastened to a steal backing plate.

In brake shoes of the above character, an intimate connection between the friction pad and the backing plate is required in order to permit the friction forces acting upon the friction pad to be absorbed by the backing plate. To achieve this, it is known by the French Pat. No. 1,322,322 to press the friction material onto the backing plate in a plastic state at a temperature of between 100° and 300°C, approximately. In this process, the friction material agglutinates with the backing plate. Further, recesses are provided in the backing plate enabling the friction material to penetrate the backing plate, thus establishing an even more intimate connection with the backing plate. This well-known procedure has the disadvantage that the backing plate forms an undetachable connection with the friction pad so that with each renewal of the individual friction pads in a brake, the backing plates also have to be replaced. In addition, in brake-shoe production the drying process performed in a furnace following pressing of the friction pads onto the backing plates is delayed because the friction pad are covered by the backing plates unilaterally so that the exhaust components can escape from the friction material only via part of the friction surface.

It is further known to rivet the friction pad on the backing plate. However, the holes required in the friction material for inserting the rivets considerably reduce the wearable volume of the friction pad, thus resulting in a shorter life of the friction pad.

SUMMARY OF THE INVENTION

It is an object of the present invention to provide a brake shoe for spot-type disc brakes consisting of a backing plate and a friction pad, wherein the friction pad is detachable from the backing plate for replacement and the new pad can be easily attached to the backing plate.

A feature of the present invention is the provision of a brake shoe for spot-type disc brakes, the disc brakes having a brake disc rotating about an axis, the brake disc including an arcuate friction surface having a radially inner and outer edge with respect to the axis, comprising: a steel backing plate; a recess disposed in the backing plate, the recess having radially inner and outer vertical walls with respect to the axis, each of the inner and outer vertical walls having a different predetermined configuration; and a friction pad embedded in and fastened to the recess, the friction pad having radially inner and outer vertical walls with respect to the axis which contact and conform to the different predetermined configurations of the inner and outer vertical walls of the recess.

In accordance with the above feature of the present invention this results in the provision of a connection between the backing plate and the friction pad, permitting, on the one hand, the transmission of high friction forces from the friction pad to the backing plate by firmly wedging the friction pad between the radially outer and the radially inner vertical wall of the recess with respect to the brake disc axis, and allowing, on the other hand, the friction pad to be readily detached from the backing plate for replacement. The capacity of the brake shoe constructed in accordance with the present invention to withstand the forces present in the friction plane is increased in particular owing to the fact that the shearing stresses no longer occur in the connecting groove between the backing plate and the friction pad, but in the friction pad itself, thus making available the full cross-sectional area of the friction pad to receive these shearing stresses. Any separation of a friction pad which is pressed onto the backing plate from the backing plate occasioned by excessive shearing stresses is hereby avoided.

A further advantage of the brake shoe constructed in accord with the present invention consists in that, seen in the direction of a chord towards the brake disc, the friction pad may be of the same length as the backing plate so as to enable full use to be made of the space available in the housing of a spot-type disc brake between the supporting surfaces. The risk of damaging the friction surfaces of the brake disc by the vertical walls of the recess is advantageously eliminated by adapting the curvature of the radially outer vertical wall of the recess to correspond to the curvature of the radially outer edge of the brake disc, and by providing the curvature of the radially inner vertical wall of the recess with a larger curvature than the curvature of the radially inner edge of the brake disc friction surface. When manufacturing the backing plates it may be an advantage that the radially inner vertical wall of the recess are of straight form. Damage to the brake disc friction surface can be avoided by adapting the radially inner corners of the recess to be located outside the brake disc friction surface.

A further feature of the present invention is the provision that the radially inner vertical wall of the recess may be advantageously curved in a direction opposite to that of the radially outer vertical wall of the recess. This results in an enlargement of the effective wedge angle between the radially inner and outer vertical walls of the recess with the aim to reduce the stresses, strains or loads occasioned within the area of the contact surfaces between the radially inner and outer vertical walls of the recess and the friction pad.

Another feature of the present invention is the provision that the friction pad comprises a plurality of components arranged in the direction of a chord one behind the other and supporting each other. In this arrangement, the contact surfaces of the friction-pad components may advantageously form an angle which is open towards the brake disc.

This causes a V-shaped groove to be created between the friction-pad components which in rain serves to drain off the water wetting the brake disc, thus accelerating the brake effect when the brake is applied. It may also be an advantage to dispose on a backing plate several friction-pad components having different friction and wear properties. This permits, for instance, inhibiting the skew wear of the brake shoes or various friction pads to be combined having optimum properties under different operating conditions.

Still another feature of the present invention is that the friction pad may be fixed to the backing plate by riveting. This will not result in a marked reduction of the wearable pad volume since as a rule one single rivet will suffice to generate the cohesive force necessary in the inventive brake shoe.

Still a further feature of the present invention is that the friction pad is fastened to the backing plate by compressing the friction pad by forcing the friction pad into the recess in the backing plate. However, such an embodiment requires that the distance between the radially inner and outer vertical walls of the recess and the outer dimensions of the friction pad be coordinated to a high degree of precision.

Another feature of the present invention is to fasten the friction pad in the recess of the backing plate by means of a cold-setting adhesive. It is furthermore an advantage to provide the surface of the friction pad adjacent the bottom of the recess with a self-sealing film.

Still another feature of the present invention is to fasten the friction pad to the backing plate in a particularly straightforward manner by mounting expanding studs on the surface of the friction pad adjacent the bottom of the recess by means of gluing or pressing in, the studs then resiliently engaging bores provided in the backing plate. This results in a connection between the friction pad and the backing plate to be established which is just as insensitive as a rivetted connection, yet in contrast thereto enjoys the advantage of being easier to mount and of avoiding the necessity to provide openings in the wearable portion of the friction pad. Such an expanding stud may also be designed as a sensor to provide a lining-wear warning indication The present invention incorporates a large number of advantages. Thus, when exchanging worn friction pads, the backing plate is reusable, which results in a reduction of the repair costs. The backing plate may be protected against corrosion by cadmium-plating or other procedures. In brake-shoe production, expenditure of friction-pad material is less, because the friction material no longer has to be pressed into anchor holes provided in the backing plate. Furthermore, it is possible to improve the drying and age-hardening process of the friction pad following pressing, since the pad is not unilaterally covered by the backing plate. This results in improved fading properties of the friction pad and less expansion of the friction pad during heating. Friction-pad production is further simplified by enabling the front and rear sides of the friction pad to be ground in parallel planes using the centerless grinding method.

Improved brake operation can be achieved with the brake shoe constructed in accordance with the present invention by rendering the transfer of heat from the friction pad to the backing plate more difficult owing to the separate design of backing plate and friction pad. Further, the multi-sectional design of the brake shoe inhibits the occurrence of brake squeal.

BRIEF DESCRIPTION OF THE DRAWING

Above-mentioned and other features and objects of this invention will become more apparent by reference to the following description taken in conjunction with the accompanying drawing, in which:

FIG. 1 is a plan view of a first embodiment of a brake shoe for a spot-type disc brake in accordance with the principles of the present invention;

FIG. 2 is a cross-sectional view of the brake shoe of FIG. 1 and the associated brake disc;

FIG. 3 is a plan view of a second embodiment of a brake shoe for a spot-type disc brake in accordance with the principles of the present invention;

FIG. 4 is a cross-sectional view of a brake shoe with the friction pad being rivetted to the backing plate, and FIG. 5 is a cross-sectional view of a brake shoe with the friction pad being fastened to the backing plate by an expanding stud.

DESCRIPTION OF THE PREFERRED EMBODIMENTS

The brake shoe illustrated in FIGS. 1 and 2 includes the backing plate 1 and the friction pad 2 which is associated with brake disc 12 rotating about axis 13, disc 12 including an arcuate friction surface 14 thereon to be engaged by pad 2 upon braking. A recess 5 is provided in backing plate 1 to accommodate pad 2. Recess 5 includes a radially outer wall 3 and a radially inner wall 4 with respect to axis 13. Recess 5 is open at the lateral faces 6 and 7. In order to prevent friction pad 2 from slipping out of recess 5, radially outer wall 3 of recess 5 is curved as illustrated, the curvature essentially corresponding to the curvature of the outer brake-disc edge. In contrast thereto, radially inner wall 4 of recess 5 is straight. Friction pad 2 is thereby secured against displacement in the backing-plate plane between the radially outer and inner vertical walls 3 and 4 of recess 5. To prevent friction pad 2 from falling out of recess 5 in the backing plate 1 to the right in FIG. 2, friction pad 2 agglutinates with the bottom of recess 5 of backing plate 1.

In the brake shoe illustrated in FIG. 3, the outer wall 3 of recess 5 includes a more marked curvature than the inner wall 4 of recess 5. The curvatures of walls 3 and 4 have a radius of curvature less than infinity.

FIG. 4 shows a brake shoe wherein friction pad 2 is fastened in recess 5 of backing plate 1 by means of a rivet 8. For inserting rivet 8 in friction pad 2, a bore 9 is required which reduces the wearable amount of the friction pad. Since the occurring forces are directly transferred from friction pad 2 to backing plate 1, it is sufficient to provide only one rivet for supporting friction pad 2 in recess 5 so that the reduction of the wearable amount of friction pad thereby occasioned can be put up with.

FIG. 5 shows a brake shoe wherein an expanding stud 10 is provided in backing plate 1 for fastening friction pad 2 in recess 5. Expanding stud 10 includes an annular flange portion 11 and a cylindrical stud portion 12. Flange portion 11 has its outer edge slotted and is of frusto-conical shape prior to being inserted into the friction pad. In order to fasten stud 10 in friction pad 2, flange portion 11 of stud 10 is inserted into a flat bore in the surface of friction pad 2 adjacent the bottom of recess 5 and then deformed by means of a force acting on stud 10 in the direction of friction pad until flange portion 11 is flattened. In this process, the outer edges of flange portion 11 embed themselves into the lateral wall of the bore is friction pad 2, thus establishing a close connection between stud 10 and friction pad 2. Stud portion 12 of stud 10 is equally slotted and so designed as to resiliently engage a bore in backing plate 1. In this way, a connection between backing plate 1 and friction pad 2 is created permitting the two components to be assembled without requiring special tools.

In the embodiments herein described, stud 10 is preferably made of copper or brass. However, it may also be made of plastics material. In this latter case, the connection with the friction pad is expediently established by means of gluing.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake shoe for spot-type disc brakes, said disc brakes having a brake disc rotating about an axis, said brake disc including an arcuate friction surface having a radially inner and outer edge with respect to said axis, comprising:
   - a one piece steel backing plate having two lateral faces;
   - a recess disposed in said backing plate, said recess having radially inner and outer walls with respect to said axis extending toward said disc and between said two lateral faces of said backing plate, each of said inner and outer walls having a different predetermined configuration; and
   - a friction pad wholly embedded in and fastened to said recess, said pad extending to at least said two lateral faces of said backing plate, said friction pad having radially inner and outer walls with respect to said axis extending toward said disc which contact and conform to said different predetermined configurations of said inner and outer walls of said recess to receive directly from said pad all brake torque exerted on said pad by said disc, said pad being fastened at at least one point to the bottom of said recess by retaining means to retain said pad in said recess without brake torque being exerted on said retaining means;
   - said configuration of said inner wall of said recess being a first curvature in a first direction; and
   - said configuration of said outer wall of said recess being a second curvature in the same direction as said first direction;
   - each of said first and second curvatures having a radius of curvature less than infinity.

2. A brake shoe according to claim 1, wherein said friction pad is fastened in said recess by a single rivet.

3. A brake shoe according to claim 1, wherein said friction pad is fastened in said recess by a cold-setting adhesive.

4. A brake shoe according to claim 1, wherein the side of said friction pad adjacent the bottom of said recess is coated with a self-sealing film.

5. A brake shoe according to claim 1, wherein said friction pad is fastened in said recess by expanding studs mounted in the surface of said friction pad adjacent the bottom of said recess and resiliently engaging a bore in the bottom of said recess.

* * * * *